United States Patent [19]

Nagasawa et al.

[11] 3,995,070

[45] Nov. 30, 1976

[54] PROCESS FOR PREPARING A CASEIN MICELLE

[75] Inventors: Taro Nagasawa; Mamoru Tomita; Yoshitaka Tamura, all of Tokyo; Tomokazu Obayashi, Tanashi, all of Japan

[73] Assignee: Morinaga Milk Industry Co., Ltd., Tokyo, Japan

[22] Filed: June 20, 1974

[21] Appl. No.: 481,237

Related U.S. Application Data

[63] Continuation-in-part of Ser. No. 403,386, Oct. 4, 1973, abandoned, which is a continuation of Ser. No. 185,662, Oct. 1, 1971, abandoned.

[30] Foreign Application Priority Data

May 26, 1971 Japan.................................. 46-35470

[52] U.S. Cl................................ 426/580; 426/657; 426/456; 426/522; 426/588
[51] Int. Cl.²....................... C12C 7/18; A23C 9/00
[58] Field of Search........... 426/587, 588, 522, 654, 426/656, 465, 471, 657, 456; 106/138, 146; 260/119

[56] References Cited
UNITED STATES PATENTS

| | | | |
|---|---|---|---|
| 2,970,913 | 2/1961 | Loewenstein............................ | 99/14 |
| 3,040,018 | 6/1962 | Wingerd............................... | 260/120 |
| 3,074,797 | 1/1963 | Peebles.................................. | 99/60 |
| 3,440,054 | 4/1969 | Sair....................................... | 99/14 |

FOREIGN PATENTS OR APPLICATIONS 46-10900  3/1971  Japan

*Primary Examiner*—Hiram H. Bernstein
*Attorney, Agent, or Firm*—Oblon, Fisher, Spivak, McClelland & Maier

[57] ABSTRACT

A casein powder, which has excellent solubility and is capable of forming a casein micelle having similar turbidity and heat stability as the casein micelle of cow's milk, when it is dissolved in water to reconstitute cow's milk, skim milk or other dairy products, can be obtained by dissolving an organic acid salt and/or polyphosphate, in an amount as represented by the formula:

$$\log y = 0.0384x + (0.70 \pm 0.25)$$

whereby $y$ is mg of organic acid salt and/or polyphosphate per gram of casein protein, and $x$ is mg of calcium ion per gram of casein protein, in a casein solution, obtained by dissolving an acid casein in an alkali. The casein solution is then mixed with a calcium salt solution in an amount such that the quantity of calcium ion present is 20 to 40 mg per gram of casein protein at a temperature of below 50° C. The pH of the resulting mixed solution is adjusted to 6.5 to 7.1, an emulsifier is added thereto, and the solution is gradually heated to a temperature of at least 65° C while stirring to form a casein micelle. Finally, the micelle is pasteurized, concentrated and dried to form a powder.

5 Claims, 3 Drawing Figures

PROCESS FOR PREPARING A CASEIN MICELLE

CROSS REFERENCE TO RELATED APPLICATIONS

This application is a continuation-in-part of application Ser. No. 403,386, filed Oct. 4, 1973, which in turn is a continuation of application of Ser. No. 185,662, filed Oct. 1, 1971 both now abandoned.

BACKGROUND OF THE INVENTION

1. Field of the Invention

The present invention relates to a process for preparing a novel casein powder from acid casein. The casein powder of this invention will dissolve in water to form a casein micelle having a turbidity and heat stability similar to those of a cow's milk casein micelle, and is excellent in solubility. More particularly, the present invention relates to a process for preparing said novel casein powder.

2. Description of the Prior Art

Various kinds of casein powders are available commercially, including sodium caseinate, calcium caseinate, acid casein, rennet casein, and coprecipitated casein. None of these powders, however, is entirely satisfactory. Sodium caseinate is poor in dispersibility, wettability and sinkability, and has a slight turbidity, although it is water soluble and has a very good final solubility. Calcium caseinate will separate and precipitate when allowed to stand, although it is water insoluble and has good dispersibility, wettability and sinkability. Coprecipitated casein, which has recently been developed, partially contains a milk serum protein. However, this casein is a mixture of calcium caseinate partially mixed with acid casein, and has substantially the same properties as calcium caseinate. Acid casein and rennet casein powders are water insoluble and so are dissolved in an alkaline agent and used as alkali caseinate.

None of these casein products, as described above, are soluble in water and none will provide a casein micelle which is similar to that of cow's milk.

In order for a casein powder to dissolve in water to form reconstituted cow's milk or skim milk, and to have a casein micelle similar to natural cow's milk, it should have the following properties:

1. It should be water soluble;
2. It should have good solubility. This means that it must have the following properties:

Good dispersibility (i.e., will not become lumpy readily);

Good wettability (i.e., will penetrate a water surface);

Good sinkability (i.e., large in particle size and will not float on the water surface);

Good final solubility (i.e., no final insolubles present).

3. The turbidity of a solution containing redissolved casein powder therein should be about the same as that of fresh skim milk after pasteurization. The turbidity of a solution containing dissolved common skim milk powder and diluted to 0.5% in protein concentration, is usually 1.58 to 1.64 in optical density (O.D.), read spectrophotometrically at 610 mu at 20° in a photoelectric colorimeter. Therefore, the casein product should desirably show a turbidity of at least 1.20 in O.D. in aqueous solution.

4. The casein micelle of a liquid prepared by redissolving a casein powder and adjusting its protein content to 3 to 5% should have good heat stability and no protein aggregate sedimentation should be found. When centrifuging 50 ml of a solution of about 10% skim milk powder, having 3% protein concentration, at 1,000 rpm at 20° C for 3 minutes in a graduated centrifugal tube, the amount precipitated is within the range of about 0.05 to 0.15 ml. Therefore, the casein should have a sufficient heat stability such that below 0.2 ml is precipitated out during the above test. A casein powder cannot be said to be good in heat stability, unless the amount of precipitate from a solution of casein powder having a protein content of about 3%, by the above test, after being subjected to a heat treatment at 120° C for 10 minutes, by means of an autoclave, is below 0.2 ml.

A process is known for forming a casein micelle similar to cow's milk as described in Japanese Patent Publication Gazette No. 10900/71 by adding potassium carbonate, dipotassium phosphate, or sodium citrate to acid casein to solubilize the casein, mixing a cooled solution of calcium chloride thereto and heating to 80° to 90° C. The product obtained by this process, however, as evidenced by the Examples, is not a powder but is a liquid having a low turbidity of 0.4 O.D., wherein the protein concentration is adjusted to 0.5% so that the casein micelle formed cannot be similar to cow's milk. (The corresponding skim milk has a turbidity of 1.6 O.D.) Also, the powder obtained by drying the product liquid has a very low water solubility.

A need, therefore, continues to exist for a casein powder which is water soluble, has good dispersibility, good wettability and good sinkability, has a turbidity about the same as fresh skim milk after pasteurization, has good heat stability and does not exhibit protein aggregate sedimentation.

SUMMARY OF THE INVENTION

Accordingly, it is an object of the present invention to provide a casein powder which has excellent solubility, and is capable of forming a casein micelle having similar turbidity and heat stability as the casein micelle of natural cow's milk, when dissolved in water to reconstitute cow's milk, skim milk or other liquid dairy products.

Another object of the present invention is to provide a method of preparing filled milk, imitation milk and other milk protein-containing products, by use of said casein powder.

These and other objects have now herein been attained by the discovery that a casein powder, having excellent solubility, and which is capable or reproducing the casein micelle, similar to that of natural cow's milk, without aggregation or precipitation of protein during such heat treatment, procedures as pasteurization, concentration, etc., can be industrially manufactured by mixing a casein protein solution, having dissolved therein an acid casein, with a calcium salt solution, for combining with the casein protein calcium ion in the presence of a specific amount of an organic acid salt and/or a polyphosphate, and an emulsifier, while adjusting the pH of the mixed solution to a specific value.

The process of the present invention is a novel process for preparing a casein powder, and is characterized by dissolving an organic acid salt and/or polyphosphate in an amount as shown by the formula:

$$\log y = 0.0384x + (0.70 + 0.25)$$

wherein $y$ is the mg of organic acid salt and/or polyphosphate per gram of casein protein, and $x$ is the mg of calcium ion per gram of casein protein, in a casein solution, obtained by dissolving an acid casein in an alkali, mixing therewith a calcium salt solution in an amount such that the amount of calcium ion is 20 to 40 mg per gram of casein protein, at a temperature of below 50° C, after adjusting the pH of the resulting mixed solution to 6.2 to 6.8, adding an emulsifier thereto, heating said solution slowly to a temperature of at least 65° C, while stirring to form a casein micelle. The micelle is pasteurized, concentrated and dried to form a powder.

BRIEF DESCRIPTION OF THE DRAWING

The foregoing and other objects of the present invention will become fully apparent from the following detailed description of a preferred embodiment of the present invention with reference to the accompanying Drawing, in which.

DETAILED DESCRIPTION OF THE PREFERRED EMBODIMENTS

Figure 1:
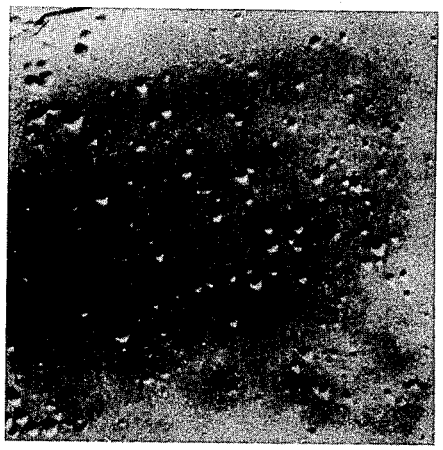
FIG. 1 is an electron microphotograph of casein micelles from fresh skim milk (total magnification: 15,000)

The combination reaction of casein protein and calcium is effected by mixing a casein protein solution and a calcium salt solution. This reaction is extremely complicated and produces various forms of combined protein and calcium products, depending upon the specific reaction conditions, such as the protein concentration of the casein solution; the concentration of the calcium salt solution; the combination ratio of the protein to the calcium, or the amount of calcium ion added to the protein, the amount of salts or other substances present, the temperature of each solution at the time of the reaction, the pH after the reaction, the reaction time, etc.

In conducting the reaction, such problems as turbidity and heat stability of the casein micelle, formed when the casein powder is redissolved in water, the solubility of the casein powder, the product properties, such as flavor, etc., and the various technical problems in manufacture, must be considered.

Although any casein powder product having any property, can be prepared by varying the manufacturing conditions, it is the intent of the present invention to prepare a casein powder which is within the range of 1.20 to 1.80 (as 0.5% in protein concentration) in optical density (O.D.), read spectrophotometrically at 610 mu in turbidity, and is below 0.2 ml (as 3.0% in protein concentration) in amount centrifuged on heating to 120° C for 10 minutes for heat stability, and is excellent in solubility. The processing conditions of this invention, therefore, have been determined so as to meet this objective.

The overall steps of this process is, therefore, preparation of a casein solution, addition and resolution of an organic acid salt or polyphosphate (hereinafter described as "salts"), preparation of a calcium salt solution and its mixing, addition of an emulsifier, adjustment of the pH of the mixed solution and preheating, pasteurization, concentration and drying.

PREPARATION OF THE CASEIN SOLUTION

Any alkali agent, usually used for food, may be employed for dissolving the acid casein. After swelling the acid casein by addition of warm water, an alkali solution is added thereto and heated to 60° to 70° C, to completely dissolve the acid casein. The pH of the casein solution is an important factor for the heat stability of the casein micelle formed. The pH of the mixed solution, before preheating, should be sufficiently high so as to be within the range of 6.5 to 7.1. The protein concentration of the casein solution should be adjusted to 5 to 12%. The solution should be cooled to a temperature of below 50° C. When the protein concentration of the casein solution is over 12%, a partial reaction can take place when the calcium salt solution is added to the casein solution, because of the high viscosity of the liquid, and a protein aggregate can be easily formed. When the temperature of the casein solution is below 50° C, even though the calcium salt solution is added to the casein solution, the aggregate precipitate of protein will not be formed, provided that the protein concentration is within the above range and the casein solution contains a reasonable quantity of organic acid salts or a polyphosphate.

ADDITION OF SALTS

Next, one or more of organic acid salts, for example, sodium or potassium salts of lactic acid, tartaric acid, succinic acid, citric acid, etc., or a polyphosphate, for example, sodium or potassium salts of polymetaphosphoric acids, such as cyclic hexametaphosphoric acid; tripolyphosphoric acid; tetrapolyphosphoric acid and the like are added to the casein solution. Of course, the combination or one or more organic acid salts and a polyphosphate may be used. For certain uses, calcium salts of the above mentioned compounds can be partially used together. It is indispensible that these salts be used with an emulsifier to maintain the heat stability of the casein micelle and to keep the turbidy within a desired range.

The amount of salts to be added is related to the quantity of calcium ion added in the subsequent step. The reasonable combination ratio of the amount of calcium ion and that of salts is represented by the following formula:

$$\log y = 0.0384x + (0.70 + 0.25)$$

wherein $y$ is the mg of salts added per gram of protein and $x$ is the mg of calcium ion added per gram of protein.

As described below, in the process of the present invention, the quantity of calcium ion to be added per gram of protein, is 20 to 40 mg. Therefore, when placing these mg numbers of calcium ion in the above formula, the values of $y$ are as follows:

when the calcium ion is 20 mg, $y = 16$ to 52.

When the calcium ion is 40 mg, $y = 96$ to 300.

As shown above, the quantity of organic acid salt and/or polyphosphate added is relevant to the number of mg of calcium added, within the range of 20 to 40 mg of calcium ion added per gram of casein protein. The reason for limiting this range is as follows:

When 20 mg of calcium ion per gram of protein is added, if the amount of salts added is below 16 mg, even in combination with an emulsifier, the heat stability will be poor. Even if the pH is adjusted, the desired casein powder cannot be obtained. Alternatively, if more than 52 mg of salts is added, the heat stability will be quite improved, but the turbidity will be low, and, as a result, the resulting casein powder will have poor dispersibility, sinkability and wettability. Thus, the addition of an excess amount of salt is meaningless and may be undesirable. Similarly, when 40 mg of calcium ion per gram of protein is added, the total amount of salts necessary is within the range of 96 to 300 mg. If the amount is outside of this range, the casein powder of the present invention cannot be obtained.

The desired objects can only be accomplished by combining the amount of organic acid salt and/or polyphosphate added within this range, with the amount of emulsifier, and by adjusting the pH of the mixed solution so that after preheating it is 6.5 to 7.1. The specific salts used will depend on the ultimate use. For instance, if it is desired to use the composition for seasoning, the organic acid salt should be mainly a polyphosphate, from the point of view of cost and quantity used, for the same amount of calcium ion. Furthermore, considering the salt balance of the final product, both types of salts may be properly used.

The organic acid salts and the polyphosphate are apparently heterogenous in grouping, but have the same effect in maintaining the heat stability of the casein micelle. Both materials do have something in common in that they react with calcium ion to produce insoluble calcium salts which are formed after a certain period of time. It is considered, therefore, that there is a compensation reaction in the combination of casein protein and an organic acid salt or a polyphosphate with calcium ion, and a certain equilibrium state is existent at a certain temperature within a certain temperature range.

When a dipotassium phosphate or tripotassium phosphate solution is mixed with calcium chloride, insoluble calcium phosphate is instantaneously formed. As organic acid salt or a polyphosphate, however, forms an insoluble salt, only after a few hours or as long as 1 day. The salt is effective for producing the desired casein micelle and in the present invention the latter salt is accepted, which is different from the former salt in the manner of forming the insoluble salt.

ADDITION OF THE CALCIUM SALT SOLUTION

In the subsequent step of adding a calcium salt solution, a solution containing 10 to 30 mg of calcium ion in 1 ml of solution, and particularly desirably, a solution of 20 mg/ml in concentration, is used. If the concentration of calcium ion is low, the addition of the calcium salt solution to the casein solution is easily carried out and a protein aggregate will not be produced at the time of mixing. However, if the concentration is below 10 mg/ml, it is heat-economically disadvantageous in the subsequent concentrating step. On the other hand, if the concentration is above 30 mg/ml, a protein aggregate will be produced, no matter how quickly thereafter it is mixed, at the time of mixing the calcium salt solution with the casein solution. When the calcium salt solution is added to the casein solution, both solutions should be mixed at a temperature of below 50° C, otherwise a protein aggregate may be produced. The larger the amount of organic acid salts or polyphosphates added to the casein solution, the higher must be the temperature for proper mixing, and the lower must be the concentration of the calcium ion in the calcium salt solution. The lower the ratio of calcium ion per gram of casein protein, the higher must be the temperature. However, the upper temperature limit is 50° C.

Next, the ratio of the calcium ion to the casein protein is preferably 20 to 40 mg of calcium ion per gram of protein. The reason is that if it is below 20 mg/g of protein, the casein micelle will be characterized by insufficient turbidity, and the final product will be poor in dispersibility, wettability and sinkability. On the other hand, if more than 40 mg/g of protein is used, even if the calcium ion content is increased, the turbidity of casein micelle will not be increased, but the micelle will have reduced heat stability, with increase of calcium ion. Although the heat stability of the micelle can be maintained by increasing the amount of salts and by using a large amount of emulsifier, the final product will be characterized by poor dispersibility, wettability and sinkability. Therefore, the use of more than 40 mg of calcium ion per gram of protein is not effective. Suitable calcium salts for the addition of calcium ion include edible water soluble calcium salts such as calcium chloride.

ADDITION OF EMULSIFIER

It is quite important that, when calcium ion is added to the casein solution, in the ratio of 20 to 40 mg of calcium ion per gram of protein, to form a casein micelle, which is thereafter heat treated at a temperature of above 100° C, the micelle should not be deteriorated in heat stability. In order to maintain the heat stability of heat treatment at elevated temperatures, it is necessary to adjust the pH of the mixed solution to above 7.1 and to add salts in an amount above the maximum value obtained by calculation of the above mentioned formula. However, the addition of a large amount of salts, and a high value of pH will substantially reduce the turbidity of solution. Therefore, an emulsifier should be added to the mixed solution before the heating operation in order to maintain a sufficient degree of turbidity at the elevated temperatures, and to improve the heat stability. Suitable emulsifiers used in the present invention are those which are conventionally used for emulsifying a fat, for example, mono- or di-glyceride, sucrose fatty acid ester, sorbitan fatty acid ester, propylene glycol fatty acid ester, soy bean lecithin, etc. The amount of emulsifier used should be within the range of 0.5 to 5.0%, based on the weight of protein.

The higher the HLB of the emulsifier, the smaller the quantity required. Conversely, the lower the HLB of the emulsifier, the greater will be the quantity required. When the quantity is below 0.5%, it is less effective and above 5% is meaningless, since it is not effective. It is impossible, however, to maintain the heat stability with only the emulsifier. The organic acid salts or polyphosphates are clearly also required and the heat stability effect of the emulsifier requires the combination of the above mentioned calcium ion and salts. Sucrose fatty acid esters and glycerol fatty acid esters can be used as they are, while a water-insoluble emulsifier should be dissolved in a small amount of animal or vegetable fat before use. If desired, the solution may be homogenized before addition of the emulsifier.

pH ADJUSTMENT AND HEATING OF MIXED SOLUTION

After adjusting the pH of the subsequent step, an emulsifier is added to the mixed solution and is preheated to provide an emulsion containing a casein micelle. When heating at 65° to 80° C, the mixed solution is reduced in pH by 0.2 to 0.3 as compared with the original casein solution with production of the casein micelle. This seems to occur because of the combination of the calcium ion with the casein protein. After heating, the pH of the mixed solution should be within the range of 6.2 to 6.8.

In the pasteurization step at above 100° C, for example, in the pasteurizing treatement at 120° C for 10 minutes in an autoclave or at 130° C for 2 seconds by a plate type pasteurizing apparatus, if the pH of the micelle producing liquid is below 6.2, protein aggregates will precipitate. If the pH is above 6.8, on the other hand, the turbidity will be lowered and the final product will be deteriorated, although the heat stability will be maintained. Therefore, the pH of the casein solution is previously adjusted to 6.5 to 7.1 so that, after heating at 65° to 80° C, the mixed solution will have a pH of 6.2 to 6.8, or alternatively, the pH may be controlled within this range while preheating at 65° to 80° C.

PASTEURIZATION, CONCENTRATION AND DRYING

The micelle producing liquid is subjected to the pasteurization operation subsequently to the concentration step. It is impossible to concentrate conventional sodium caseinate because of its high viscosity and vigorous forming, and the limit of concentration is about 14% in protein concentration. For example, when concentrating a casein micelle solution prepared by combining casein, sodium citrate and dipotassium phosphate in a ratio selected so as to maintain sufficient turbidity, a protein aggregate will be formed and will adhere to the heating zone of the concentrating apparatus, so that the efficiency of the heat process is reduced. Continued concentration thereafter becomes difficult. On the other hand, when the amount of sodium citrate added is increased beyond the maximum required by calculation in the above formula, in an attempt to prevent the adhesion of protein aggregate on the heating surface, the formation of protein aggregate will be decreased, but the turbidity will be, simultaneously, reduced and the viscosity of concentrated liquid will rise rapidly. Therefore, the degree of concentration is necessarily reduced, and even if the concentrated casein micelle solution is sprayed and dried, the resulting casein powder will be poor in dispersibility, wettability and sinkability. However, according to the process of the present invention, when an emulsifier as above described is added, a casein micelle producing liquid can be easily concentrated to above 25% by weight protein concentration, with less bubbling and without formation of a protein aggregate on the heating surface of the concentration apparatus. Further, the micelle producing liquid of the present invention is thermally more economically in spraying and drying, as compared with the spraying and drying of sodium caseinate, since the liquid is as low in viscosity as 100 c.p. at 50° C, so that it can be easily sprayed and dried even if concentrated to about 25 to 30% by weight protein concentration.

The casein powder obtained in the final drying step, that is, in the usual spray-drying step, is characterized by larger powder particles and lower bulk density, as compared with sodium caseinate powder. It may thus be referred to as a dense powder which has good dispersibility, wettability, sinkability and solubility, because it is high in solid content of concentrated casein micelle liquid and has a viscosity as low as 100 c.p. at 50° C.

The appearance of the casein micelle of the casein powder manufactured by the process of the present invention will be shown by an electron microphotograph. That is, each sample solution was diluted to adjust the protein concentration to about 0.06% (about 50 times) and, after immediately spraying on a mesh with collodion film by means of a nebulizer, was dried at 50° C for 30 minutes. The resulting film was then shadowed with chromium, and reinforced by depositing carbon thereon, in a vacuum evaporator (JEE-4A type manufactured by Nippon Electron Co., Ltd.). Each sample after shadowing was directly photographed by means of an electron microscope of 10,000 magnification (JEM - T6S type manufactured by Nippon Electron Co., Ltd.).

FIG. 1 is an electron microphotograph of casein micelles from fresh skim milk (total magnification: 15,000); the skim milk used was a common skim milk which had a pH of 6.65, 1.63 in O.D., and had good heat stability.

Figure 2:
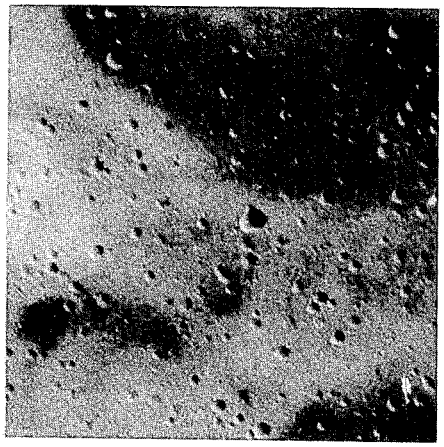
FIG. 2 is an electron microphotograph of casein micelles from fresh casein powder manufactured according to the process of the present invention (Example 1) (total magnification: 15,000)

FIG. 2 is an electron microphotograph of casein micelles from the novel casein powder manufactured by the method of Example 1 in the present invention (total magnification: 15,000); the novel casein powder obtained in Example 1 was, as described below, good in solubility, low in the amount precipitated by centrifugation, 6.25 in pH and 1.62 in O.D. Comparing the two figures, the difference between the two micelles could scarcely be recognized, and it has been found that the casein micelle of the present invention is extremely similar to the natural casein micelle.

Figure 3:
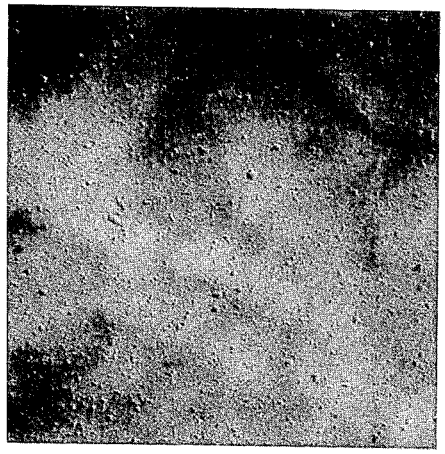
FIG. 3 is an electron microphotograph of a casein powder treated under the conditions outside the scope of the present invention (total magnification: 15,000).

FIG. 3 is an electron microphotograph of casein powder manufactured under conditions which are outside the present invention, in which calcium ion is 20 mg and sodium citrate is 100 mg per gram of casein protein. The pH after heating was 6.4 and an emulsifier was not used. The total magnification was 15,000 and the turbidity of this casein powder was 0.80 and the other conditions were almost the same as in Example 1. Comparing FIG. 3 with FIGS. 1 and 2, the casein micelle of FIG. 3 is finer and, as can be seen, is incomplete.

In order to show the solubility of the casein powder obtained by the present invention, an experiment was carried out as follows:

Each of 10 g of casein powder obtained by the present invention, skim milk powder, and sodium caseinate, which is the only aqueous casein commercially available, was added to breakers containing 90 ml of water at 20° C while stirring with a constant rotating velocity (about 300 rpm.) until complete resolution was measured. The following results were obtained:

The casein powder obtained in Example 1 of the present invention was dissolved in about 1 minute, skim milk powder was dissolved in about 1.2 minutes on the average and sodium sodium caseinate was almost dissolved in 15 minutes, but a lump was still existent.

Thereafter, the same experiment was carried out to determine the solubility of various other casein powders. As a result, it was found that the casein powder, manufactured according to this invention, was completely dissolved within 2 minutes and was not inferior to skim milk powder in solubility.

Further, the casein powder used in FIG. 3, outside the manufacturing conditions of the present invention, required about 10 minutes for dissolution in the same experiment.

Each step of the present invention has been explained in detail as above. However, the order of addition of each solution is optional. For example, the adjustment of pH may be carried out at any time provided the casein micelle liquid after heat pasteurization is finally 6.2 to 6.8 in pH. Also, the mixed solution of the calcium salt and the organic acid salts or polyphosphates, may be added to the casein solution. Alternatively, the casein solution can be added to the above mixed solution, although it is not desirable to add a solution of an organic acid salt or polyphosphate to the casein solution before adding the calcium salt solution.

The emulsifier may be added in any step provided it is added before heat pasteurization. Further, according to one modification of the present invention, it is possible to prepare a casein protein solution or a casein powder, which has good heat stability, by using a divalent ion, such as magnesium, ferrous, cupric ion, etc., instead of the calcium ion, in combination with the calcium ion depending on the desired object. Also, another casein protein solution or casein powder having a specific ash composition for special medicinal treatments or animal experiments, can be prepared by use of a neutral salt, such as sodium chloride, potassium chloride, magnesium chloride, etc., in combination with a calcium chloride solution, prepared as the calcium ion containing solution and controlling the ash composition in the casein protein solution or casein powder.

It is possible to manufacture various food products such as ice cream, yogurt, fruit beverages, coffee beverage, biscuits, bread, etc., using a novel casein powder prepared by the process of the present invention, and the products according to the process of the present invention may be widely used with almost any food.

Having generally described the invention, a further understanding can be attained by reference to certain specific Examples which are provided herein for purposes of illustration only and are not intended to be limiting unless otherwise specified.

EXAMPLE 1

Lactic acid casein was sufficiently swollen in water at 50° C and thereafter 10% $K_3PO_4$ (tripotassium phosphate) solution was dissolved thereto. After adding water to adjust the protein concentration to 10%, it was heated to 70° C to completely dissolve the casein protein. The composition of lactic acid casein used and ingredients per 1000 Kg of 10% casein solution were as follows:

| General Composition of Lactic Acid Casein | | Ingredients per 1000 Kg of 10% casein solution | |
|---|---|---|---|
| Protein | 84.0% | Lactic acid casein | 119.05 Kg |
| Ash | 2.5% | $K_3PO_4$ | 7.15 Kg |
| Water | 12.0% | Water | 873.80 Kg |
| Other | 1.5% | | |
| Total | 100.0% | Total | 1,000.00 Kg |

The casein solution had a 10% concentration of protein and a pH of 6.30. After adding 15 Kg of 50% sodium lactate solution to the above mentioned casein solution, the casein solution was cooled to 40° C. (The ratio of 75 mg of sodium lactate per gram of casein protein.) Next, 11.03 Kg of calcium chloride ($CaCl_2 \cdot 2H_2O$) was dissolved in water to 150 l and added to the above casein solution. The calcium ion concentration of the calcium chloride solution was 20 mg/ml and the temperature was 81° C. (Calcium ion 30 mg per 1 g of protein). Next, the emulsifier (sucrose fatty acid ester, HLB 11) was added to the above mentioned casein solution to 1% of protein. Since the mixed solution of the casein solution, sodium lactate, calcium chloride and emulsifier had a pH of 6.05, the pH was adjusted to 6.50 using 10% NaOH solution. After adjusting the pH, the solution was preheated to 65° C and, thereafter, was pasteurized at 130° C for 2 seconds by means of a conventional plate type pasteurizer.

After pasteurization, the casein solution had the following properties:

| pH | 6.25 at 20° C |
|---|---|
| Curd | (—) |
| Amount precipitated | Below 0.05 ml |
| Turbidity (O.D.) | 1.69 |

Note 1: The judgment of curd was conducted by visual examination and the absence of curd was indicated by (—).

Note 2: The casein solution was sampled so that the sample contained about 2.5 g of protein and, after diluting to 50 ml, the amount precipitated was measured at 20° C, 1,000 rpm for 3 minutes in a graduated centrifuging tube.

Note 3: The turbidity value was obtained by measuring the optical density of the casein solution diluted to 0.5 in protein concentration at 610 mμ in light absorbability using a photoelectric colorimeter.

Next, the casein solution containing a colloidal casein micelle after pasteurization, was concentrated to about 26% in protein concentration, using a conventional plate type concentrating apparatus. The adhesion of protein aggregate to the heating surface of concentrating apparatus was scarcely observed and bubbling during concentration was slight, and so the concentration state was good. At this time, the viscosity of the concentrated solution was about 70 c.p. at 50° C. Next, the above mentioned concentrated solution was sprayed and dried using a conventional pressure type spraying drier of 210° C at hot air introducing mouth and 90° C air at air discharging mouth to about 91 Kg of casein powder of 3.60% in moisture content. This casein powder was dissolved in water and under the same conditions as that of the casein solution. After pasteurization, pH, curd, amount precipitated and turbidity (O.D.) were measured. The results were as follows:

| | |
|---|---|
| pH | 6.25 at 20° C |
| Curd | (−) |
| Amount precipitated | below 0.05 ml |
| Turbidity | 1.62 |

According to the above mentioned manufacturing conditions, a casein powder was obtained in which a colloidal casein micelle was found to be present in a stable state and which is favorable in flavor, water solubility and far better in dispersibility, wettability, sinkability and solubility, as compared with conventional casein powder currently commercially available on the market.

EXAMPLE 2

After sufficiently swelling the same lactic acid casein, as in Example 1, in water at 50° C, 10% NaOH solution was added thereto, and heated to 70° C to completely dissolve casein protein. The ingredients per 1,000 Kg of 10% casein solution were as follows:

| | |
|---|---|
| Lactic acid casein | 119.05 Kg |
| NaOH | 2.20 Kg |
| Water | 878.75 Kg |
| Total | 1,000.00 Kg |

The above casein solution had a protein concentration of 10% and a pH at 20° C of 6.3. Next, a solution of 20 Kg of sodium hexametaphosphate and 11.40 Kg of sodium citrate ($Na_3C_6H_5O_7 \cdot 2H_2O$) in 100 l of water was added to the casein solution and cooled to 35° C. Next, 14.7 Kg of calcium chloride ($CaCl_2 \cdot 2H_2O$) dissolved in 200 ml of water was added to the above mentioned casein solution.

Since the above mixed solution had a pH of 6.1, the pH was adjusted to 6.6 using a 10% $K_2PO_4$ solution. After adjustment, the solution was preheated to 65° C and the emulsifier (glycerine fatty acid ester HLB 3.5) was added thereto to 2% protein. After resolution, it was pasteurized at 130° C for 2 seconds by the conventional plate type pasteurizing apparatus, in the same manner as in Example 1. The casein solution after pasteurization had, similarly as in Example 1, the following properties:

| | |
|---|---|
| pH | 6.32 at 20° C |
| Curd | (−) |
| Amount precipitated | below 0.05 ml |
| Turbidity (O.D.) | 1.66 |

Next, similarly as in Example 1, the casein solution after this pasteurization, was concentrated to about 25% in protein concentration, using the conventional plate type concentrating apparatus. The adhesion of protein aggregate to the heating zone of the concentrating apparatus was scarcely observed and bubbling during concentration was slight. The concentration state was therefore good. At this time, the viscosity of concentrated solution was about 80 c.p. at 50° C.

Next, the solution was dried by a conventional pressure type spray drier, under the same conditions as in Example 1. The casein powder obtained was 3.20% in moisture content and about 87 Kg in yield.

The casein powder was dissolved in water, and after pasteurization, the casein solution was measured for pH, curd, amount centrifuged, and turbidity (O.D.) under the same condition. The results were as follows:

| | |
|---|---|
| pH | 6.32 at 20° C |
| Curd | (−) |
| Amount precipitated | Below 0.05 ml |
| Turbidity (O.D.) | 1.68 |

According to the above mentioned manufacturing conditions, a casein powder was obtained in which a colloidal casein micelle existed in a stable state, and which is favorable in flavor, soluble in water, and far better in dispersibility, wettability, sinkability and solubility as compared with conventional commercially available casein powders.

Having now fully described the invention, it will be apparent to one of ordinary skill in the art that many changes and modifications can be made thereto without departing from the spirit or scope of the invention.

We claim:

1. A process for preparing a casein powder which comprises:

dissolving a salt selected from the group consisting of sodium or potassium lactate, tartrate, citrate, tripolyphosphate, tetrapolyphosphate, polymetaphosphate and mixtures thereof, in an amount represented by the formula:

$$\log y = 0.0384x + (0.70 \pm 0.25)$$

wherein $y$ is the mg of said salt per gram of casein protein and $x$ is the mg of calcium ion per gram of casein protein, in a casein containing solution which is obtained by dissolving an acid casein in an edible alkali to a casein concentration of 5 to 12%, and mixing therewith an aqueous solution of calcium chloride in such an amount that the amount of calcium ion becomes 20 to 40 mg per gram of casein protein at a temperature of below 50° C, and after adjusting the pH of the resulting mixed solution to 6.5 to 7.1, adding an emulsifier thereto in an amount of 0.5 to 5.0% based on casein protein content, heating the solution to a temperature of at least 65° C to form a casein micelle, and pasteurizing, concentrating and drying the casein micelle liquid to form said powder.

2. The process of claim 1, wherein said emulsifier is selected from the group consisting of glycerine fatty acid ester, sucrose fatty acid ester, sorbitan fatty acid ester, propylene glycol fatty acid ester and soya bean lecithin.

3. The process of claim 1, wherein the aqueous solution of calcium chloride has a concentration of from 10 to 30 mg of calcium ion per ml of solution.

4. The process of claim 1, wherein the casein solution is heated at a temperature of from 65° to 80° C to form said casein micelle liquid.

5. A casein powder prepared by the process which comprises:

dissolving a salt selected from the group consisting of sodium or potassium lactate, tartrate, citrate, tripolyphosphate, tetrapolyphosphate, polymetaphosphate and mixtures thereof in an amount as represented by the formula:

$$\log y = 0.0384x + (0.70 \pm 0.25)$$

wherein $y$ is the mg of said salt per gram of casein protein and $x$ is the mg of calcium ion per gram of casein protein, in a casein containing solution which is obtained by dissolving an acid casein in an edible alkali to a casein concentration of 5 to 12%, and mixing therewith an aqueous solution of calcium chloride in such an amount that the amount of calcium ion becomes 20 to 40 mg per gram of casein protein at a temperature of below 50° C, and after adjusting the pH of the resulting mixed solution to 6.5 to 7.1, adding an emulsifier thereto in an amount of 0.5 to 5.0% based on casein protein content, heating the solution to a temperature of at least 65° C to form a casein micelle, and pasteurizing, concentrating and drying the casein micelle liquid to form said powder.

* * * * *